(12) United States Patent
Saeten

(10) Patent No.: US 9,230,461 B2
(45) Date of Patent: Jan. 5, 2016

(54) COLLAPSIBLE DISPLAYING DEVICE AND METHOD FOR USING THE SAME

(71) Applicant: Anne Jorun Saeten, Bergen (NO)

(72) Inventor: Anne Jorun Saeten, Bergen (NO)

( * ) Notice: Subject to any disclaimer, the term of this patent is extended or adjusted under 35 U.S.C. 154(b) by 0 days.

(21) Appl. No.: 14/398,609

(22) PCT Filed: May 22, 2013

(86) PCT No.: PCT/NO2013/050090
§ 371 (c)(1),
(2) Date: Nov. 3, 2014

(87) PCT Pub. No.: WO2013/176552
PCT Pub. Date: Nov. 28, 2013

(65) Prior Publication Data
US 2015/0107139 A1    Apr. 23, 2015

(30) Foreign Application Priority Data

May 24, 2012   (NO) .................................. 20120610

(51) Int. Cl.
*G09F 15/00* (2006.01)
*A47B 97/08* (2006.01)
*A47F 5/10* (2006.01)

(52) U.S. Cl.
CPC ............ *G09F 15/0056* (2013.01); *A47B 97/08* (2013.01); *A47F 5/10* (2013.01)

(58) Field of Classification Search
CPC ............ G09F 15/0062; Y10T 16/1937; Y10T 16/1943; E01F 9/0122; B62B 2205/14; B62B 2205/145
USPC ................. 40/610, 606.02; 206/747; 301/128
See application file for complete search history.

(56) References Cited

U.S. PATENT DOCUMENTS

| 6,240,666 | B1 | 6/2001 | Apel et al. |
| 7,004,481 | B1 * | 2/2006 | Stanish ................. A45C 5/146 190/108 |

(Continued)

FOREIGN PATENT DOCUMENTS

| CA | 2284417 | 3/2001 |
| EP | 10006504 | 6/2000 |

(Continued)

OTHER PUBLICATIONS

International Search Report and Written Opinion for PCT/NO2013/050090 dated Sep. 8, 2013.

*Primary Examiner* — Joanne Silbermann
(74) *Attorney, Agent, or Firm* — Andrus Intellectual Property Law, LLP

(57) ABSTRACT

A displaying device comprises a movable storage device adjustable between at least a closed position and an open position, an elastic image-building body adjustable between at least an inactive position and an active position. The image-building body, in its inactive position, is arranged to be accommodated by the storage device in the closed position thereof. The image-building body includes a substantially gas-tight cavity. The displaying device includes a valve arranged to be connected to a gas source, the valve being arranged to provide gas communication between the gas source and the cavity, so that the cavity may be filled with gas, and the image-building body may be raised into its active position when the storage device is in its open position. A method is for using a displaying device. A compressor is for putting up an image-building wall.

17 Claims, 7 Drawing Sheets

(56) References Cited

U.S. PATENT DOCUMENTS

| | | | |
|---|---|---|---|
| 8,555,535 B1 * | 10/2013 | Watson | 40/612 |
| 2005/0138853 A1 * | 6/2005 | Chiang | 40/594 |
| 2007/0094907 A1 | 5/2007 | Scarberry | |
| 2010/0243854 A1 | 9/2010 | Logue | |

FOREIGN PATENT DOCUMENTS

| | | |
|---|---|---|
| FR | 2598541 | 11/1987 |
| FR | 2871821 | 12/2005 |
| WO | 2013176552 | 11/2013 |

\* cited by examiner

COLLAPSIBLE DISPLAYING DEVICE AND METHOD FOR USING THE SAME

CROSS-REFERENCE TO RELATED APPLICATIONS

This application is the U.S. national stage application of International Application PCT/NO2013/050090, filed May 22, 2013, which international application was published on Nov. 28, 2013, as International Publication WO2013/176552 in the English language. The international application is incorporated herein by reference, in entirety. The international application claims priority to Norwegian Patent Application No. 20120610, filed May 24, 2012, which is incorporated herein by reference, in entirety.

FIELD

The invention relates to a displaying device. More specifically, the invention relates to a displaying device including a movable storage device arranged to accommodate an elastic, inflatable image-building body.

BACKGROUND

For a person or a company wishing to build a positive image of themselves or their products, it will be a great advantage to be able to use compact, mobile solutions in connection with fairs, exhibitions, conferences and the like.

Known displaying devices are mainly based on various types of cloths/textiles printed on one side, the cloth/textile being mounted on a stand in plastic or aluminium. Further, the known displaying devices are often relatively heavy and, in addition, cumbersome to store and transport. They generally consist of several parts that have to be assembled and disassembled when being used, which may be very time-consuming. If, in addition, such a displaying device is to have light and/or sound connected to it, that will often be separate units, requiring extra effort and equipment in connection with assembling/disassembling and connecting/disconnecting. A printed cloth will be usable only for the one purpose for which it is intended, and the back of the displaying device generally has an inelegant appearance that should desirably be hidden.

The patent publication US 2007/0094907 A1 discloses a displaying device which includes a base unit and an inflatable frame connected to the base unit.

In the patent publication U.S. Pat. No. 6,240,666 B1, an information carrier is described, including an inflatable hollow body made of a flexible, foldable material and a blower for blowing an air flow into the hollow body.

SUMMARY

The invention has for its object to remedy or reduce at least one of the drawbacks of the prior art or at least provide a useful alternative to the prior art.

The object is achieved through features which are specified in the description below and in the claims that follow.

In a first aspect, the invention relates to a displaying device, the displaying device including:
- a movable storage device adjustable between at least a closed position and an open position;
- an elastic image-building body adjustable between at least an inactive position and an active position, the image-building body, in its inactive position, being arranged to be accommodated by the storage device in the closed position thereof, the image building body including a substantially gas-tight cavity; and
- a valve arranged for connection to a gas source, the valve being arranged to provide gas communication between the gas source and the cavity, so that the cavity may be filled with gas and the image-building body may be raised into its active position when the storage device is in its open position, characterized by the storage device being provided with at least one pair of wheels placed on an axis of rotation, the wheels being arranged to be pulled out axially from the storage device into a pulled-out position on an axle coinciding with said axis of rotation.

In a first embodiment, the displaying device may include a compressor. Thus, by connecting the compressor to a power source, the image-building body may be raised into its active position by the substantially gas-tight cavity being filled with air via the valve by means of the compressor. The room in which the displaying device is positioned may thus function as the gas source. In alternative embodiments, the compressor may be supplied with energy from alternative energy sources such as a battery or a solar panel.

In an embodiment in which the displaying device does not include a compressor, the image-building body could be raised into its active position by, for example, a gas cylinder with pressurized gas being connected to the valve, thus filling the substantially gas-tight cavity. Various suitable gases could be used.

In another embodiment of the displaying device, the storage device may be arranged to function as a base for the image-building body in the active position thereof. This is to say, a lower portion of the image-building body will remain in the storage device as the image-building body is raised into its erect position. A portion of the image-building body may be fixed to the storage device.

In a third embodiment of the displaying device, the storage device may be provided with at least one pair of wheels placed on a common axis of rotation, the wheels being arranged to be pulled out axially from the storage device into a pulled-out position on an axle coinciding with said axis of rotation. This has the advantage of the wheels of the storage device being usable for a further stabilisation of the storage device with the image-building body. The axle may be bipartite, so that the axle can be pulled out from the storage device together with the wheels. Alternatively, the axle may be telescopic.

In one embodiment, the at least one pair of wheels may be lockable in the pulled-out position. This may help to ensure the stabilization of the storage device. The wheels may be lockable so that axial and/or rotational movement is prevented. The wheels may also be axially lockable in a recessed, not pulled-out, position.

In a fourth embodiment of the displaying device, the image-building body may be formed, in a portion, of an adhesive material. This will facilitate the adherence of various image-building materials to the image-building body. The adhesive material may be a Velcro™-like material, for example.

In a fifth embodiment, the displaying device may include one or more light sources. The light sources may, for example, be integrated in the image-building body and/or in the storage device. The light sources may be battery-operated or they may have power supplied via a power cable, for example the same power cable that may provide power supply to a possible compressor. The light sources may be used to illuminate the image-building body from both the outside and the inside. Light sources on the inside of the image-building body could be used as background lighting during a film show or the like, whereas light sources on the outside may be used to project pictures or film onto the image-building body.

In a sixth embodiment, the displaying device may, as an alternative or in addition, include one or more loudspeakers. The loudspeakers may be arranged to be connected to a sound source, for example an iPod® or the like.

In a second aspect, the invention relates to a method of using a displaying device, the displaying device including:
a mobile storage device adjustable between at least a closed position and an open position,
an elastic image-building body adjustable between at least an inactive position and an active position, the image-building body, in its inactive position, being arranged to be accommodated in the storage device in the closed position thereof, characterized by the method including the following steps:
opening the storage device into its open position;
providing a gas source;
placing the gas source in gas communication with a substantially gas-tight cavity in the image-building body via a valve; and
filling the cavity in the image-building body with gas from the gas source via the valve, so that the image-building body is raised into its active position.

In a first embodiment, the method may further include connecting the displaying device to a power source.

In another embodiment the method may, in addition or as an alternative, include filling the cavity with gas by means of a compressor.

In a third embodiment, the method may include using the storage device as a foundation for the image-building body when the image-building body is in its active position.

If the storage device is used as a foundation, the method may further include pulling at least one pair of wheels out axially from the storage device on an axle to which the wheels are connected. The advantage of this is described in the above.

The use of a compressor for putting up an image-building is described as well.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
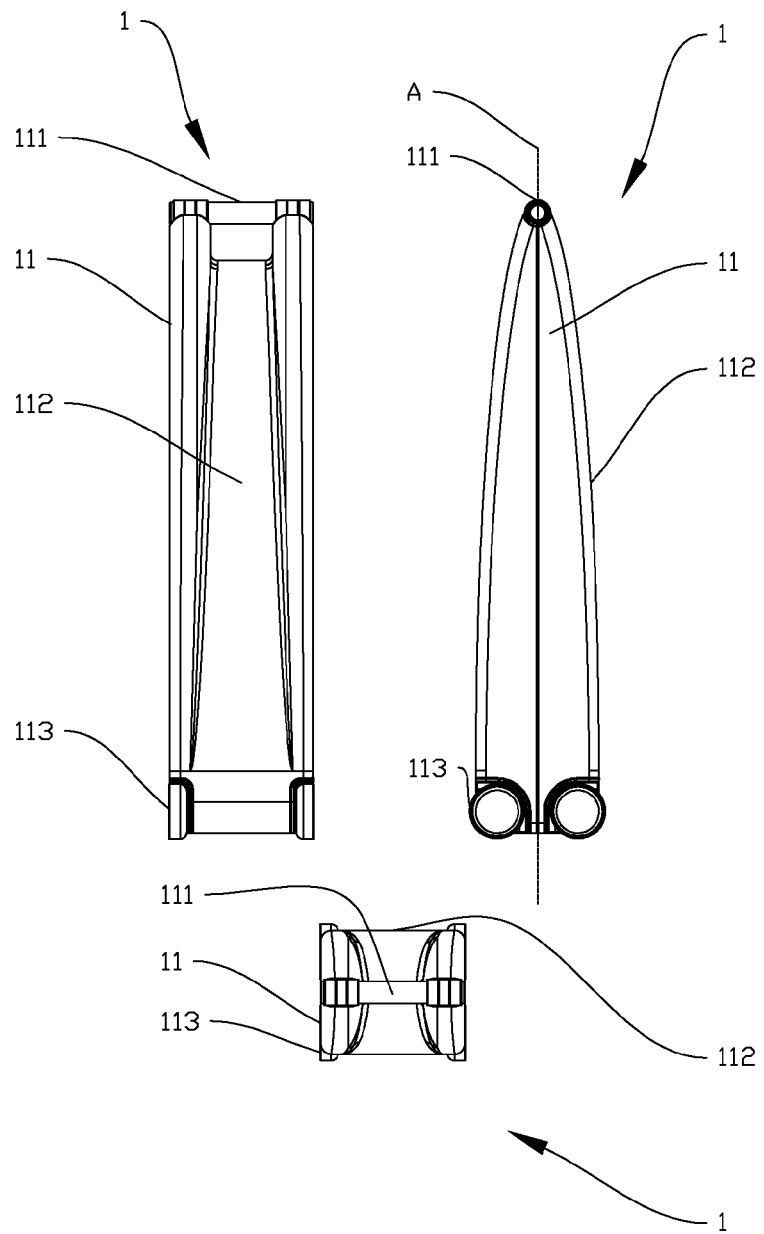
FIG. 1 shows a storage device in the closed position thereof viewed from different sides.

In what follows, the reference numeral 1 indicates a displaying device in accordance with the invention. The figures shown are schematic and simplified.

In FIG. 1, a storage device 11 of the displaying device 1 is shown in a closed position. In the figure, the storage device 11 is shown from the front at the top left, from the side at the top right and from above at the bottom. In the embodiment shown, the storage device 11 is provided as an erect, slim suitcase. In an upper portion, the suitcase 11 is provided with a handle 111. The suitcase 11 is symmetrical and dividable around an axis of symmetry A that extends through the handle 111. Further, the suitcase 11 is provided with two pairs of wheels 113, one pair on either side of the axis of symmetry A, each pair of wheels 113 being rotatable around a common rotational axis R. Each pair of wheels 113 is placed on a bipartite axle 115 with one wheel on either part. The division of the axle 115 inside the suitcase 11 is not shown in the figures.

Figure 2:
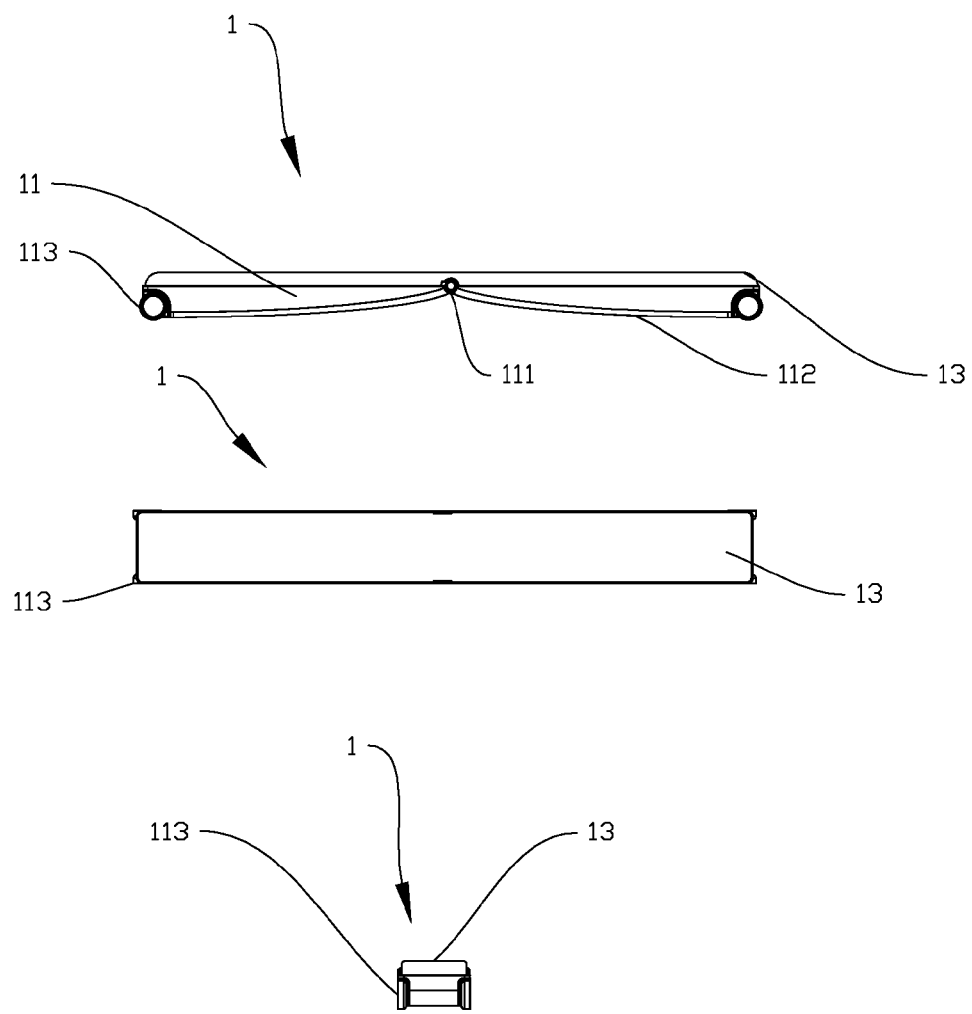
FIG. 2 shows, on a smaller scale than FIG. 1, a storage device in an open position with an image-building body in an inactive position, viewed from different sides.

In FIG. 2, the suitcase 11 is shown in an open position and on a smaller scale than in FIG. 1. The suitcase is shown from the side at the top, from above in the middle and from the front at the bottom of the figure. The suitcase 11 has been opened by it having been divided around the handle 111, each of the two symmetrical parts of the suitcase 11 being rotatable around the handle 111 around an axis normal to the axis of symmetry A. Each part has been rotated by about 90° around the handle 111, and the suitcase 11 has been turned and is resting on a surface with two outer sides 112 against the surface. An elastic image-building body 13 which was accommodated in the suitcase 11 in the closed position thereof is visible in a non-active position in the figure. The outer sides 112 of the suitcase 11 are relatively flat, so that they will lie stably on a flat surface.

Figure 3:
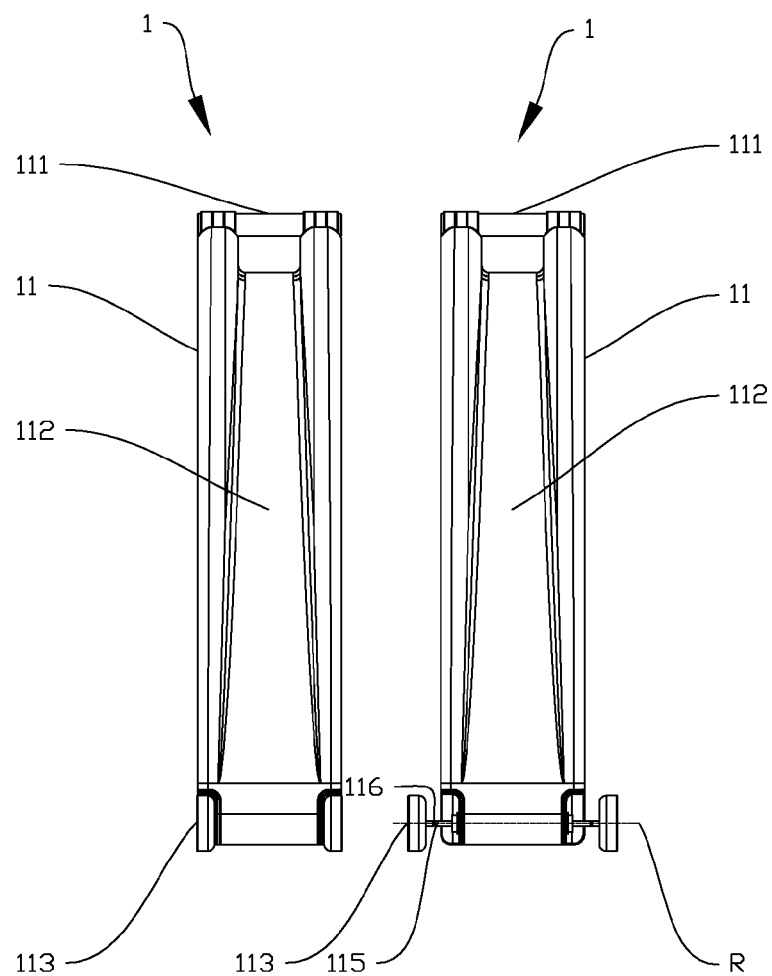
FIG. 3 shows, on the same scale as FIG. 1, a storage device with wheels in a recessed position and a pulled-out position, viewed from the front.

FIG. 3 shows the suitcase 11 in the closed position again and on the same scale as FIG. 1. To the left in the figure, the suitcase 11 is shown in a view corresponding to that at the top left in FIG. 1, with the wheels 113 in a recessed position, whereas to the right in the figure, the suitcase 11 is shown with the wheels 113 in a pulled-out position. Each wheel 113 has been pulled out axially from the suitcase 11 on the bipartite axle 115. The axles 115 are arranged to be pulled out from the suitcase 11 together with the wheels 113 as shown in the figure. In one embodiment, the wheels 113 will be axially and/or rotationally lockable in the pulled-out position. The locking may be done by means of a technique known per se, for example by a preloaded locking mechanism, not shown, engaging grooves, not shown, on the axle 115. The grooves may correspond to grooves 116 on the axle arranged to lock the wheels 113 axially in the recessed position by means of the same locking mechanism, see FIG. 7. The pulled-out wheels 113 contribute to giving the suitcase 11 further stability.

Figure 4:
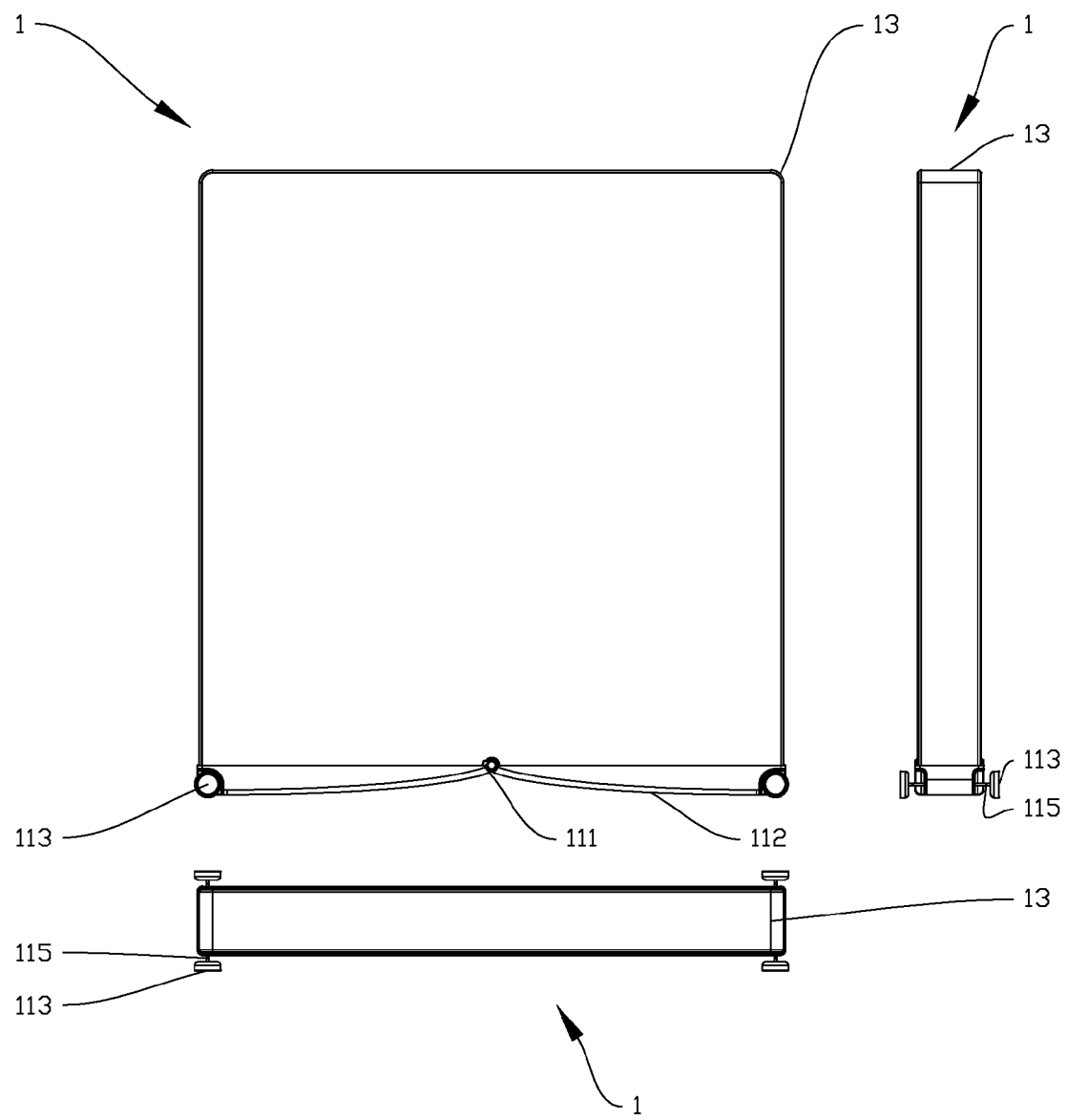
FIG. 4 shows, on the same scale as FIG. 2, a storage device in an open position with an image-building body in the active position, viewed from different sides.
Figure 5:
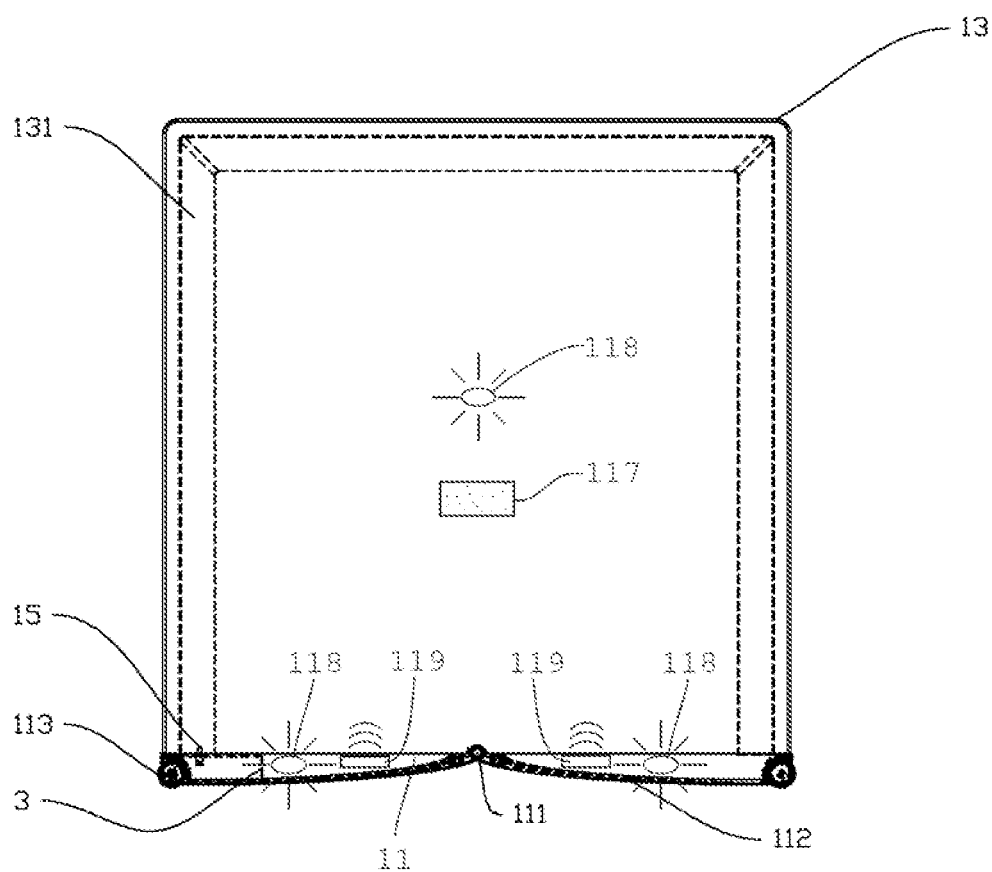
FIG. 5 shows, on the same scale as FIG. 2, a storage device in the open position and an image-building body in the active position, viewed from the side.

In FIG. 4, on the same scale as FIG. 2, the displaying device 1 is shown with the image-building body 13 in an active, raised position. The displaying device 1 is shown from the front at the top left, from the side at the top right and from above at the bottom of the figure. The image-building body 13 in the form of an image-building wall has been raised within the frames of the suitcase 11, so that the latter functions as a base for the image-building body 13. The image-building body 13 has been raised into its active position by a substantially gas-tight, tubular cavity 131 in the periphery of the image-building body 13 having been filled with air. In the embodiment shown, the cavity 131 has been filled with air by means of a compressor 3 placed in the suitcase 11 as indicated in FIG. 5. The compressor 3 is connected to a power outlet, not shown, in a manner known per se. In an alternative embodiment, all or a major pan of the image-building body 13 may be arranged to be filled by gas. In FIG. 5, the image-building bad 13 may be formed with an adhesive material 117 in the form of a Velcro™-like material so that profile-building materials may be added to the image-building body 13. One or more light sources 118 may be incorporated into the storage device 11 and/or the image-building body 13. One or more loudspeakers 119 may be included in the displaying device 1.

Figure 6:
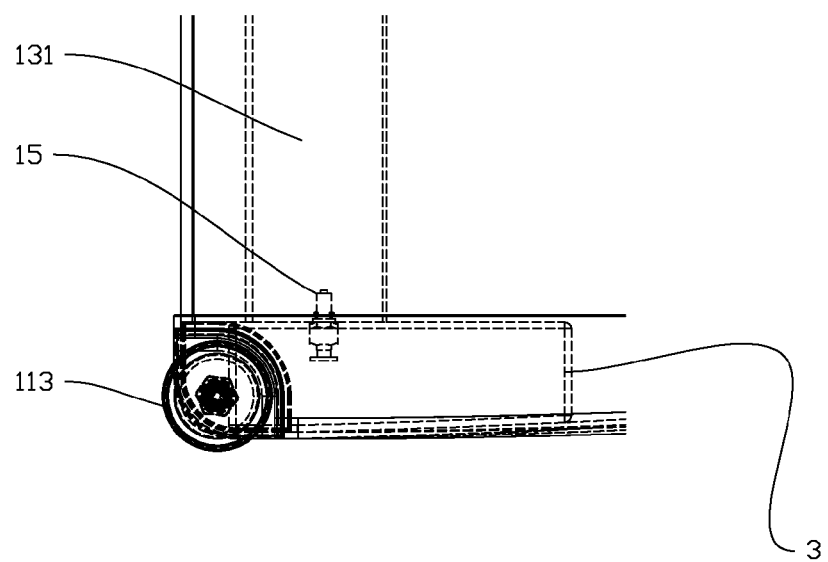
FIG. 6 shows an enlarged detail from FIG. 6, viewed from the side.

In FIG. 6, an enlarged detail from FIG. 5 is shown. The compressor 3 is indicated together with a valve 15 which connects the compressor 3 to the cavity 131. In alternative embodiments, the valve 15 may connect other gas sources to the cavity 131.

Figure 7:
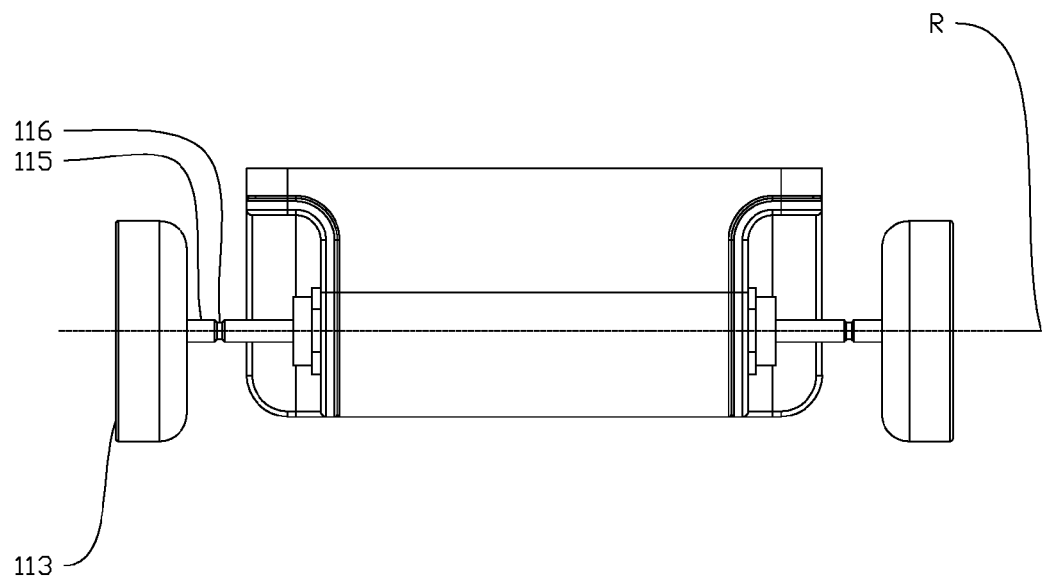
FIG. 7 shows an enlarged detail from FIG. 3.

In FIG. 7, an enlarged detail from FIG. 3 is shown. A portion of the suitcase 11 is shown with the wheels 113 on the axle 115 in a pulled-out position. A groove 116 on the axle may be used together with a locking mechanism, not shown, to lock the wheels 113 axially in a recessed position.

The invention claimed is:

1. A displaying device, the displaying device comprising:
a movable storage device adjustable between at least a closed position and an open position;
an elastic image-building body adjustable between at least an inactive position and an active position, the image-building body, in the inactive position, being arranged to be accommodated by the storage device in the closed position thereof, the image-building body including a substantially gas-tight cavity; and
a valve arranged for connection to a gas source, the valve being arranged to provide gas communication between the gas source and the cavity, so that the cavity may be filled with gas, and the image-building body may be raised into the active position when the storage device is in the open position, wherein the storage device is provided with at least one pair of wheels placed on an axis of rotation fixed relative to the storage device, the wheels being arranged to be pulled out axially from within an outer boundary of the storage device into a pulled-oat position outside the storage device on an axle coinciding with the fixed axis of rotation.

2. The device in accordance with claim 1, wherein the displaying device comprises a compressor.

3. The device in accordance with claim 1, wherein the storage device, in the open position, is arranged to function as a base for the image-building body in the active position thereof.

4. The device in accordance with claim 1, wherein the at least one pair of wheels is lockable in the pulled-out position.

5. The device in accordance with claim 1, wherein the profile-building body is formed, at least in a portion, with an adhesive material, so that various profile-building materials can easily be attached to the image-building body.

6. The device in accordance with claim 1, wherein the displaying device comprises one or more light sources.

7. The device in accordance with claim 1, wherein the displaying device comprises one or more loudspeakers.

8. The device in accordance with claim 1, wherein the movable storage device includes a handle and two parts rotatable about the handle between the closed position and the open position.

9. The device in accordance with claim 8, wherein, in the closed position, the storage device is symmetrical and dividable relative to an axis of symmetry lying in a plane passing through the handle and between and adjacent the wheels.

10. The device in accordance with claim 9, wherein, in the open position, the two parts and the wheels are movable away from the axis of symmetry passing through the handle.

11. The device in accordance with claim 1, wherein the gas-tight cavity is a tubular cavity extending along a periphery of the image-building body.

12. The device in accordance with claim 1 device,
wherein the movable storage device includes a handle and two parts rotatable about the handle between the closed position and the open position.

13. A method of using a displaying device, the displaying, device comprising:
a movable storage device adjustable between at least a closed position and an open position;
an elastic image-building body adjustable between at least an inactive position and an active position, the image-building body, in the inactive position, being arranged to be accommodated in the storage device in the closed position thereof,
wherein the method comprises:
opening the storage device into the open position;
providing a gas source;
placing the gas source in gas communication with a substantially gas-tight cavity in the image-building, body via a valve;
filling the cavity of the image-building body with gas from the gas source via the valve, so that the image-building body is raised into the active position, and
pulling at least one pair of wheels out axially from within an outer boundary of the storage device on an axle to which the wheels are connected along an axis of rotation fixed relative to the storage device, so that the stability of the storage device is improved when the storage device is used as a base for the image-building body.

14. The method in accordance with claim 13, wherein the method further comprises connecting the displaying device to a power source.

15. The method in accordance with claim 13, wherein the method further comprises filling the cavity with gas by means of a compressor.

16. The method in accordance with claim 13, wherein the method further comprises using the storage device as a base for the image-building body when the image-building body is in the active position.

17. The method in accordance with claim 13, wherein the movable storage device includes a handle and two parts rotatable about the handle between the closed position and the open position.

* * * * *

UNITED STATES PATENT AND TRADEMARK OFFICE
CERTIFICATE OF CORRECTION

PATENT NO. : 9,230,461 B2  
APPLICATION NO. : 14/398609  
DATED : January 5, 2016  
INVENTOR(S) : Anne Jorun Saeten Page 1 of 1

It is certified that error appears in the above-identified patent and that said Letters Patent is hereby corrected as shown below:

In the Claims:

Claim 1, column 5, line 38: delete "pulled-oat", insert --pulled-out--.

Claim 12, column 6, line 14: delete "device" after the words "claim 1".

Claim 13, column 6, line 31: delete the "," after the word "image-building".

Signed and Sealed this
Nineteenth Day of April, 2016

Michelle K. Lee
*Director of the United States Patent and Trademark Office*